United States Patent [19]

Tangorra et al.

[11] 4,004,628

[45] Jan. 25, 1977

[54] PNEUMATIC WHEEL FOR MOTOR VEHICLES

[75] Inventors: Giorgio Tangorra, Monza (Milan); Giovanni Calori, Milan, both of Italy

[73] Assignee: Industrie Pirelli S.p.A., Milan, Italy

[22] Filed: Feb. 28, 1975

[21] Appl. No.: 554,190

[30] Foreign Application Priority Data

Mar. 4, 1974 Italy .................. 48941/74
Oct. 4, 1974 Italy .................. 28039/74

[52] U.S. Cl. .................. 152/383; 152/353 C; 152/398; 152/404
[51] Int. Cl.² .................. B60C 5/12
[58] Field of Search .............. 152/353 C, 375, 379, 152/380, 381, 382, 383, 396–414

[56] References Cited

UNITED STATES PATENTS

| | | | |
|---|---|---|---|
| 736,414 | 8/1903 | Litchfield | 152/404 |
| 1,707,014 | 3/1929 | Horkinson | 152/397 X |
| 2,074,284 | 3/1937 | Stevenson | 152/398 |
| 3,234,989 | 2/1966 | Nuf | 152/398 X |
| 3,805,868 | 4/1974 | Tangorra | 152/353 C |
| 3,895,668 | 7/1975 | Tangorra | 152/379 |

Primary Examiner—Robert B. Reeves
Assistant Examiner—John P. Shannon
Attorney, Agent, or Firm—Stevens, Davis, Miller & Mosher

[57] ABSTRACT

The beads of a pneumatic tire having sidewalls of a cross-sectional shape, wherein upon inflation the midline thereof between the tread reinforcement and bead is convex with respect to the interior of the tire, are gripped by a rim having an annular channel generally elliptically shaped in cross-section and having its open side directed radially outwardly with respect to the axis of the wheel and inwardly directed annular flanges only partially closing the open side of the channel.

19 Claims, 8 Drawing Figures

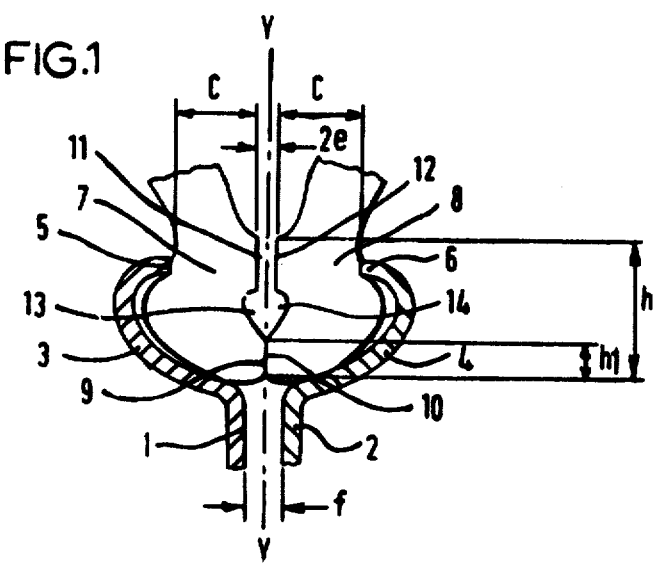
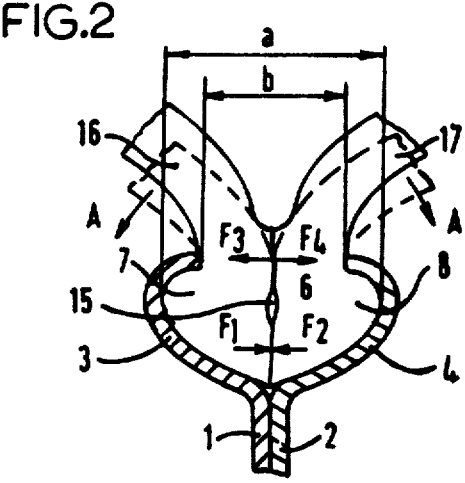

PNEUMATIC WHEEL FOR MOTOR VEHICLES

The present invention relates generally to pneumatic wheels for motor vehicles and more particularly to the connection between a pneumatic tire and a rim therefor.

Vehicle tires, such as "pneumatic tires", have a tread and two sidewalls, each of which terminates along its radially inner portion called a "bead".

The bead constitutes the tire portion intended to be connected to the wheel in order to form a single unit called a "pneumatic wheel".

Generally, in conventional tires, because of the internal pressure, the sidewalls are prevailingly stressed under tension. In that case, the most common way to mount the tire on the rim is that of forcing the base of the beads, made circumferentially inextensible, against two conical surfaces on the sides of the rim.

U.S. Pat. No. 3,805,868 describes a tire in which, because of the internal pressure, the sidewalls are prevailingly stressed to compression and bending because each sidewall is pushed in an axially outer direction and is simultaneously compressed against two fixed points. These two points are the edge of an inextensible annular structure arranged in a radially inner position with respect to the tread and a circumferentially incompressible rim.

Because of the prevailing compression and bending stress, the sidewalls and the beads of the patented tire can be formed from a homogeneous material, such as, for instance, an elastomeric material devoid of any reinforcing structure (as layers of cords) and can be made by a simple pouring or molding process.

Since it is desirable to maintain a certain anchorage between the beads and the rim of the patented tire in order to avoid its possible detachment, even in particular conditions, such as, for instance, in the absence of the inflation pressure and/or in consequence of high lateral thrusts, one of the applicants has proposed in his U.S. Pat. No. 3,895,668 a particular connection between the tire and the relative rim which gives to the cross-section of the tire a triangular shape with positive effects on the behaviour of the tire itself. This connection is effected by encasing the two beads of the tire into a single circumferential seat provided in the rim, the seat having a circumferential opening of a width smaller than the maximum width of the seat. The beads are of such a size as to be axially compressed one against the other by the walls of the seat so that they are strongly anchored to the rim and any possibility of detachment of the elements, even in the worst conditions, is prevented.

It has now been found that, by adopting some expedients, it is possible to further improve the efficiency of this latter type of anchorage.

An object of the invention is therefore to provide an improved connection between the pneumatic tire and the corresponding rim, which is a simple construction and is consequently ecomical.

Another object of the invention is to provide a tire of the general kind disclosed in U.S. Pat. No. 3,805,868 having an improved bead construction for securing it in a rim. Still another object of the invention is to provide a pneumatic tire of the kind described in the rim assembly.

Other objects will become apparent from the following description with reference to the accompanying drawing wherein FIG. 1 illustrates, in cross-section, the bead and adjacent sidewall portion of one embodiment of the invention in the cavity of a rim prior to clamping to secure the tire to the rim;

FIG. 2 illustrates, in cross-section, the embodiment of FIG. 1 with the beads clamped in the seat of the rim;

Figure 1A:
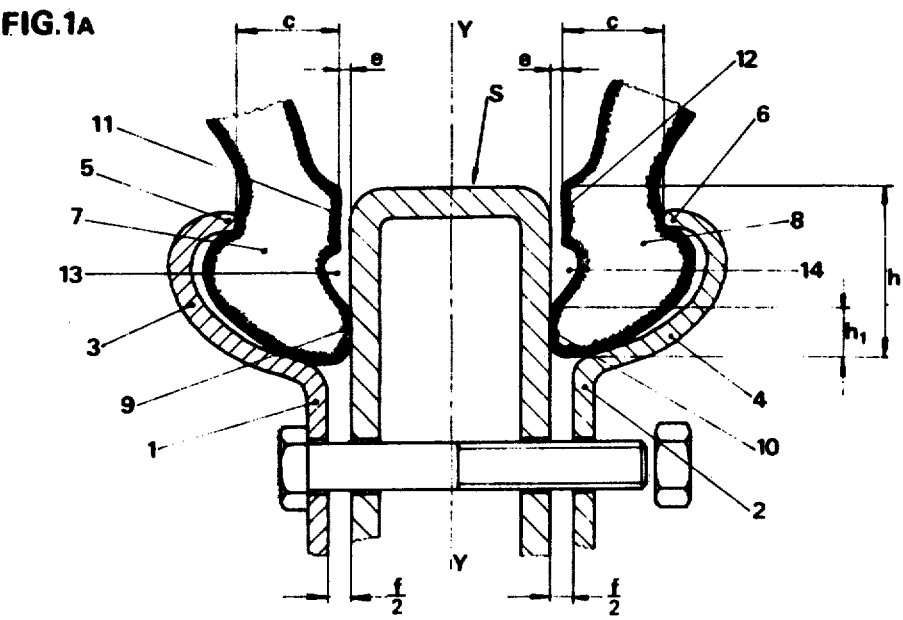
FIG. 1A illustrates, in cross-section, a second embodiment of the invention prior to clamping of the beads in the rim seat.

In accomplishing the foregoing objects, the present invention provides a pneumatic wheel for motor vehicles having a pneumatic tire with a tread reinforced by an annular inextensible structure, two sidewalls having their own section midline in the meridian plane with its convexity directed towards the inside of the tire and such that in consequence of the inflation air, they are subjected to combined bending/compression stresses, the sidewalls terminating into two beads for connecting the tire to a rim, the rim having at least one seat having the shape of a circumferential channel with an opening directed in a radially outer direction with respect to the axis of rotation of the pneumatic wheel, the radially outermost ends of the rim being directed towards the midline of the pneumatic wheel to constitute the opening, the width of the opening being smaller than the maximum width of the seat itself, the beads having such a size, with respect to the seat, as to be axially compressed, characterized in that the beads have respectively two circumferential surfaces axially facing each other, each surface comprising a first radially innermost zone and a second radially outermost zone, the axial distance between the first zones, when the tire is not clamped by the rim, being smaller than the distance between the second zones. Alternatively, the two beads of the tire are inserted in a single seat of the rim to be axially compressed the one against the other, or the two beads are each inserted in its own seat of the rim, to be axially compressed against a separating element which axially separates the seats. In the latter embodiments it is preferable for the separating element to be constituted by a good heat conducting material and to connect the inner cavity of the tire with the rim.

Preferably, the difference between the axial distance between the second zones and the axial distance between the first zones is between 5 and 20% of the width of the two beads measured at the height of the radially outermost ends of the rim, while the height of the first zones, measured in the radial direction, is between ¼ and ¾ of the total height, measured in the same sense, of the circumferential surfaces.

According to a preferred alternative embodiment, the first radially innermost zone of each bead is separated from the second radially outermost zone by means of a circumferential groove.

Preferably, the circumferential groove has a cross-section ranging between 5 and 30% of the cross-section of each bead, the profile of the same being selected from semi-circular, semi-ovoidal, semi-elliptical geometrical figures and the figure of a half drop whose point is directed towards the axis of rotation of the tire.

According to a preferred embodiment, when the tire is in its inflated condition, the width of the opening is smaller than the width of the corresponding beads measured at the height of the ends of the rim, so that the ends interfere with the outer profile of the beads; preferably, the ratio between the width, measured at the height of the ends of the rim and the width of the opening of the seat of the rim, is between 1.05 and 1.2.

Preferably, the axially outer profile of each bead is provided with grooves directed in radial sense and spaced at intervals in circumferential direction.

Figure 6:
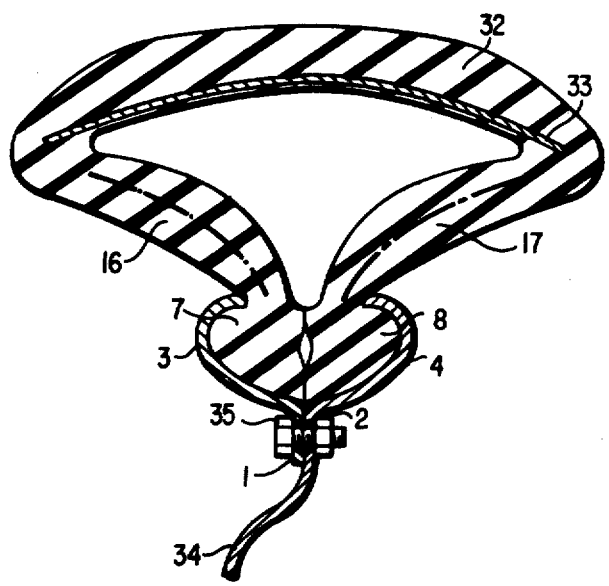
FIG. 6 illustrates, in cross-section, the entire tire assembled with a rim of the type illustrated in FIGS. 1 and 2.

The invention and relative advantages will now be better illustrated with reference to the attached drawings, given by way of example. FIG. 6 represents the cross-section of a pneumatic wheel of the type described in U.S. Pat. No. 3,895,668; and in particular the connection between the tire and the rim.

As shown in FIG. 1 the rim is divided into two parts 1 and 2 which can be clamped the one against the other (as shown in FIG. 2) by means of bolts or other means not represented. Each part of the rim is provided with a flange 3 and 4, whose ends 5 and 6 are directed towards the median axis YY of the pneumatic wheel.

When the two parts of the rim are clamped together as shown in FIG. 2, the flanges 3 and 4 form a circumferential seat, having a maximum width $a$ greater than the width $b$ of its opening, which is also circumferential and is defined by the axial distance between the two ends 5 and 6, the ratio $b/a$ being preferably selected among the values of 0.3 and 0.9.

The circumferential seat is intended to receive the beads 7 and 8 of the pneumatic tire, so that the axially innermost surfaces of the beads, facing each other, are compressed together in consequence of the closure of the rim.

FIG. 1 shows the beads 7 and 8 inserted in the seat of the rim, when the parts 1 and 2 of the latter are not clamped the one against the other.

As it will be noted, the axially facing surfaces of the beads 7 and 8 comprise respectively a first zone 9 and 10, parallel to axis YY, which is radially inner with respect to a second zone 11 and 12, parallel to axis YY, which is radially outer in the rim seat.

The zones 9 and 10 are in mutual contact while the zones 11 and 12 are spaced apart by a quantity $2e$ before clamping is shown in FIG. 1. In other words, the axial distance, when the tire is free, between zones 9 and 10 is smaller than the axial distance between zones 11 and 12. Moreover, each bead has a width $c$, measured at the height of the rim ends 5 and 6, such that $2c$ is greater than the width $b$ between the ends 5 and 6 (see also FIG. 2) and, as a function of the size of the tire and of the use for which this is intended the ratio $2c/b$ is preferably between 1.05 and 1.2.

The difference between the axial distance between zones 11 and 12 and the axial distance between the zones 9 and 10 (in FIG. 1 represented by $2e$) is preferably between 5 and 20% of $2c$.

According to the size of the tire and to the use for which it is intended, the height $h1$ of the zones 9 and 10, measured in the radial direction, can appropriately vary between ¼ and of the value of the total height $h$ of the axially facing surfaces of the beads.

Moreover, as shown in FIG. 1, the first radially inner zones 9 and 10 are separated from the zones 11 and 12 by the circumferential grooves 13 and 14 facing each other.

Each groove has a cross-section whose area is between 5 and 30% of the area of the cross-section of each bead, the area of the cross-section of the two coupled beads, without groove, being between 1 and 1.4 times the area of the cross-section of the rim seat formed by the two flanges 3 and 4 approached to each other.

Grooves 13 and 14 are mutually facing so that, when they approach each other, they have a section profile which can be conveniently selected among a circular, ovoidal, elliptical or drop profile, the point of the drop being directed towards the axis of rotation of the tire, as represented in FIG. 1.

The assembling of the pneumatic wheel is carried out as follows: the parts 1 and 2 of the rim are detachable and are therefore separate; the beads 7 and 8 are inserted between the flanges 3 and 4 in such a way that the circumferential surfaces 9 and 10, 11 and 12 and the corresponding circumferential grooves 13 and 14 are facing each other. Then the flanges 3 and 4 are axially approached and these compel the beads to approach to each other.

When the circumferential surfaces 9 and 10 come into mutual contact, also the ends 5 and 6 of the rim are respectively in contact with the corresponding points of the outer profile of the beads, while the two parts 1 and 2 of the rim are spaced from each other by a quantity $f = 2c + 2e - b$, the whole as represented in FIG. 1.

By further approaching mutually the flanges 3 and 4, by means of bolts or other means not represented, the surfaces 11 and 12 continue their mutual approach, while the surfaces 9 and 10 begin to be compressed against each other; at the same time the grooves 13 and 14 begin to take a first deformation with respect to the profile which had been originally imparted to them.

When the value f has been annulled, namely when the two parts of the rim have been joined together, the flanges 3 and 4 of the rim exert a strong axial compression on the beads 7 and 8, which is transmitted to the circumferential surfaces 9 and 10 and 11 and 12, which deform, discharging on their turn the deformation on the grooves 13 and 14 which take a profile 15, as shown in FIG. 2.

Said compression, however, is not uniformly distributed, but the surfaces 9 and 10 are more mutually compressed than the surfaces 11, 12, with the result that the center of mutual thrust between the two beads is lowered with respect to that which would be obtained if the axial compression were uniformly distributed on the whole surface of contact between the two beads themselves.

In these conditions, when the pneumatic wheel is inflated and subjected to the vertical load of the vehicle, its sidewalls 16 and 17, rotating as indicated by arrow A (see dotted lines in FIG. 2), transmit a part of the deformation to the respective beads, which are further pushed towards each other at the surfaces 9 and 10 from the forces F1 and F2 and, as the center of thrust of the forces is lowered as said above, the relative movements of the two beads with respect to the rim, tending to rotate them and therefore to raise them towards the opening of the rim are substantially prevented with the advantage of having an improved anchorage of the beads to the rim.

On the contrary, in consequence of the deformation of the sidewalls 16 and 17, forces F3 and F4 are exerted on the surfaces 11 and 12, and these forces tend to discharge the compression between the surfaces; this action is contrasted by the ends 5 and 6 of the rim which contain the tendency.

If the pneumatic wheel were stressed simultaneously by the vertical load of the vehicle and by a strong lateral thrust as, for instance, in curves of the roadway, the above indicated principle may vary slightly in the sense that one sidewall suffers a greater deformation than the other. In that case forces F1 and F2 are not balanced with respect to each other, so that the bead corresponding to the most stressed sidewall tends to slightly rotate with respect to the opposite bead and therefore to be raised towards the rim opening. However, in consequence of the rotation, there is a greater compression between the two beads, at surfaces 9 and 10 (even if the center of mutual thrust tends to lift), which opposes any further relative movement between the two beads. At the same time, the rim end corresponding to the most stressed sidewall reacts in a more relevant manner against the outer profile of the bead, so that it cooperates in limiting the movement of rotation of the bead itself.

Obviously, when the action of the lateral thrust on the pneumatic wheel is released, also the different stresses on the sidewalls are discontinued, so that the relative beads return to their original position as shown in FIG. 2.

Figure 2A:
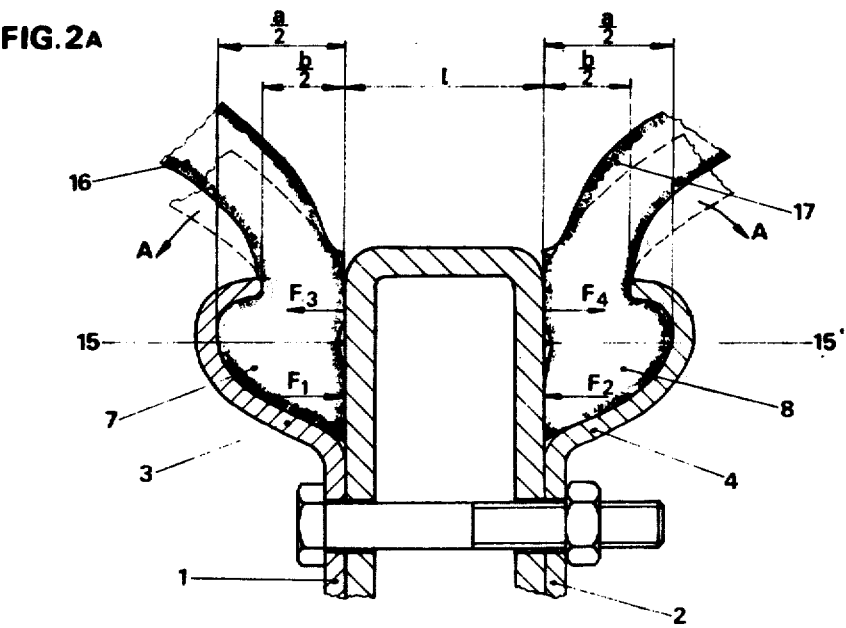
FIG. 2A illustrates, in cross-section, the embodiment of FIG. 1A after the beads have been clamped in the rim seat.

FIGS. 1A and 2A correspond substantially to the FIGS. 1 and 2 respectively, with the only difference being that a separating element S is interposed between the two parts 1 and 2 of the rim and between the beads 7 and 8, which element defines two distinct seals in which the tire beads ae encased.

The separating element can be constituted by a metallic ring (or cylinder) of any desired width 1, so as to determine the required axial distance between the two beads of the tire. In this way, it is possible to obtain a tire whose cross-section has a substantially triangular shape, as in the case of FIG. 1, or substantially trapezoidal, as illustrated in U.S. Pat. No. 3,805,868.

In the illustrated example, the separating element appears as a piece added to the rim, and is secured to this by means of a plurality of bolts. However, it is to be understood that in other embodiments it may constitute an integral part with the base of the rim.

In any case, it is advisable for the separating element S to be made of good heat conducting material and to connect the inner cavity of the tire with outer parts of the rim, so as to facilitate the dissipation of the heat generated in the cavity during the tire use.

As can be noted, the embodiment shown in FIG. 1A (with beads free in their own seats) and in FIG. 2A (with beads clamped in their own seats) corresponds substantially to that shown in the respective FIGS. 1 and 2, with the only difference being that the beads, instead of being compressed the one against the other, in consequence of the locking of the rim, are compressed against the walls of the separating element S.

Taking the alternative into account, what is described in respect of FIGS. 1 and 2 is valid, as principle, also for FIGS. 1A and 2A, for which the same numerical references have been maintained.

Figure 3:
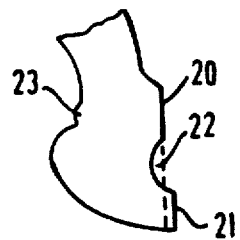
FIGS. 3, 4 and 5 illustrate, in cross-section, alternate embodiments of beads of tires provided by the invention.
Figure 4:
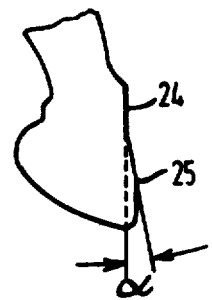
Figure 5:
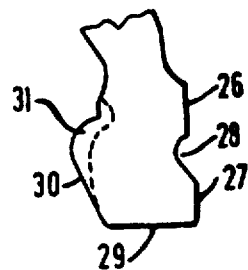

FIGS. 3, 4 and 5 show as many alternative embodiments of the profile which can be imparted to the beads of the present invention.

FIG. 3 shows, in particular, that the axially inner surfaces 20 and 21 are separated by means of a circumferential groove 22, whose section profile is constituted by an arc of a circle.

Moreover, the axially outer profile of the bead has an edge 23 intended to come into contact with the radially outermost ends of the rim (see references 5 and 6 of FIG. 1). The surface of the edge interferes with the ends of the rim when the latter is locked on the beads.

FIG. 4 shows a bead profile in which the axially innermost surfaces 24 and 25 are not separated by any groove; in that case it is preferable to impart to at least a part of the surface 25 an inclination which may vary by an angle of from 5° to 20° with respect to the vertical line, according to the use for which the pneumatic wheel is intended.

FIG. 5 shows another bead profile in which the two surfaces 26 and 27 are separated by means of a circumferential groove 28 having the shape of a half drop with its point directed towards the axis of rotation of the pneumatic wheel.

The outer profile has moreover a base 29 much more pronounced than that of the beads of FIGS. 3 and 4. In that case the axially outer profile 30 of the bead which is connected to the base has an angle, with respect to the vertical line, which is substantially smaller than that of the corresponding profiles of the preceding Figures. In that case, owing to the more massive configuration of the bead, it is preferable to obtain on its axially outermost profile radial grooves 31 arranged at intervals in the circumferential direction, in order that, according to the material of which the bead is made, it is possible to insure to the bead the deformability necessary to provide a good locking of the two parts of the rim.

The embodiment of FIGS. 1 and 2 is illustrated in FIG. 6 as a complete pneumatic tire and rim assembly. The tire has a tread portion 32 and a breaker structure 33 similar to those of the tire of the aforesaid U.S. Patent application Ser. No. 421,059. Sidewalls 16 and 17 are integral with beads 7 and 8. The beads 7 and 8 are secured in the seat of the rim formed by parts 3 and 4 bolted together by bolts 35. Part 4 of the rim is integral with flange 34 of the wheel.

It is understood that the above examples have not a limiting character and that the scope of protection of the present invention includes all modifications and alternative embodiments deriving from the above indicated inventive principle.

What is claimed is:

1. A pneumatic wheel for motor vehicles comprising a rim and a pneumatic tire with a tread reinforced by an annular inextensible structure, two sidewalls having their own section midline in the meridian plane with its convexity directed towards the inside of the tire and such that in consequence of te inflation air they are subjected to combined bending and compression stresses, said sidewalls terminating in two beads connecting the pneumatic tire to the rim, said rim having at least one seat having the shape of a circumferential channel with an opening directed in a radially outer direction with respect to the axis of rotation of the pneumatic wheel, the radially outermost ends of said rim being directed towards the midline of the pneumatic wheel to constitute said opening, the width of said opening being smaller than the maximum width of said seat, said beads having a size with respect to said seat which adapts them to be subjected to an axial compression, said beads having respectively two circumferential surfaces axially facing each other, each surface having a first radially innermost zone and a second radially outermost zone, the axial distance, when the beads are not locked in the rim seat, between said first zones being smaller than that between said second zones, the axial compression corresponding to said first radially innermost zone being greater than that corresponding to said second radially outermost zone when the beads are locked in said seat, whereby the center of the axial thrust of the beads is radially inward with respect to that which would be obtained if the axial compression were uniformly distributed on said circumferential surfaces axially facing each other.

2. The pneumatic wheel of claim 1 wherein the two beads are inserted in a single seat of the rim to be axially compressed against each other.

3. The pneumatic wheel of claim 1 wherein the two beads are each inserted in its own seat of the rim to be axially compressed against a separating element which axially spaces said seats.

4. The pneumatic wheel of claim 3 wherein said separating element is a good heat conductor and connects the inner cavity of the tire with said rim.

5. The pneumatic wheel of claim 1 wherein the difference between the axial distance between said second zones and the axial distance between said first zones is comprised between 5% and 20% of the width of the two beads measured at the height of the radially outermost ends of the rim.

6. The pneumatic wheel of claim 1 wherein the height of said first zones, measured in the radial direction, is between one-quarter and three-quarters of the total height, measured in the same sense, of said circumferential surfaces.

7. The pneumatic wheel of claim 1 wherein the first radially innermost zone of each bead is separated from the second radially outermost zone by means of a circumferential groove.

8. The pneumatic wheel of claim 7 wherein said circumferential groove has a cross-section between 5 and 30% of the cross-section of each bead.

9. The pneumatic wheel of claim 7 wherein said circumferential groove has a semi-circular profile in section.

10. The pneumatic wheel of claim 2 wherein when the two beads are locked in the rim seat and are axially compressed against each other, the width of the opening of said seat determined by the axial distance between the radially outermost ends of said rim being smaller than the width of the two beads measured at the height of said ends of said rim, so that said ends interfere with the outer profile of the beads.

11. The pneumatic wheel of claim 10 wherein the ratio between the width of the two beads, measured at the height of said ends of the rim and the width of the opening of said seat of the rim is between 1.05 and 1.2.

12. The pneumatic wheel of claim 3 wherein when the two beads are each locked in its own seat of the rim and axially compressed against said separating element, the width of the opening of each seat is smaller than the width of the corresponding bead, measured at the height of the radially outermost end of said rim, so that said end interferes with the outer profile of the bead.

13. The pneumatic wheel of claim 12 wherein the ratio between the width of one bead measured at the height of said end of the rim and the width of the opening of the corresponding seat of the rim is between 1.05 and 1.2.

14. The pneumatic wheel of claim 10 wherein the axially outermost profile of each bead has grooves directed in the radial direction and spaced at intervals in the circumferential direction.

15. In a rim and pneumatic tire assembly for a vehicle comprising a rim and a pneumatic tire having a reinforced tread having a given width and side edges and two sidewalls comprising elastomeric material extending from said tread side edges and terminating in beads for a rigid wheel rim, wherein said given width of the tread is wider than any other part of the tire and is reinforced over substantially the whole of its width by an annular structure which is substantially inextensible under the tire inflation pressure in both its circumferential and lateral directions, and wherein said sidewalls have a cross-sectional shape whose midline over substantially the whole length between the side edges of the tread reinforcement and the bead is convex with respect to the interior of the tire under the tire inflation pressure, each of said sidewalls having a bending stiffness, curvature of thickness sufficient to constrain the sidewall between said side edges of the inextensible tread reinforcement and the bead seat on the wheel rim whereby on inflation of the tire and under service conditions the sidewalls are placed under compressive stress, the improvement wherein the said rim comprises two symmetrical rings adapted to be detachably secured together, a substantially arcuate shaped flange which flares outwardly from the ring and then projects inwardly towards the median line of the rim, said flanges when the rings are secured together enclosing an annular channel which is substantially elliptical in cross-section and compressing the beads of said tire therein, said beads having a cross-sectional configuration when compressed in the channel with their facing surfaces disposed against each other which corresponds to the configuration of the channel, each of said facing surfaces having an annular groove therein which is directly opposite the other and divides the bead into radially inner and outer zones, said beads when disposed in the rim channel prior to compression by the rim having been disposed with respect to each other with their radially outer zones spaced farther apart than their radially inner zones.

16. The pneumatic wheel of claim 7 wherein said circumferential groove has a semi-ovoidal profile in section.

17. The pneumatic wheel of claim 7 wherein said circumferential groove has a semi-elliptical profile in section.

18. The pneumatic wheel of claim 7 wherein said circumferential groove has the configuration in section of a half-drop bring its point directed towards the axis of rotation of the tire.

19. A rim and pneumatic tire assembly for a vehicle comprising a pneumatic tire having a reinforced tread having a given width and side edges and two sidewalls comprising elastomeric material extending from said tread side edges and terminating in beads for a rigid wheel rim, said given width of the tread being wider than any other part of the tire and reinforced over substantially the whole of its width by an annular structure which is substantially inextensible under the tire inflation pressure in both its circumferential and lateral directions, said sidewalls having a cross-sectional shape whose midline over substantially the whole length between the side edges of the tread reinforcement and the bead is convex with respect to the interior of the tire under the tire inflation pressure, each of said sidewalls having a bending stiffness, curvature of thickness sufficient to constrain the sidewall between said side edges of the inextensible tread reinforcement and the bead seat on the wheel rim whereby on inflation of the tire and under service conditions the sidewalls are placed under compressive stress, said rim comprising two symmetrical rings adapted to be detachably secured together, a substantially arcuate shaped flange which flares outwardly from the ring and then projects inwardly towards the median line of the rim, said flanges when the rings are secured together enclosing an annular channel, said beads having facing surfaces, facing annular grooves in said surfaces which divide the beads into radially outer and radially inner zones, the cross-sections of the radially outer zones being thinner than the cross-sections of the radially inner zones whereby prior to compression by the rim, the facing surfaces of the outer zones are spaced apart when the facing surfaces of the inner zones are touching and, when the beads are locked in the rim under compression, the radially inner zones are under greater compression than the radially outer zones.

* * * * *

UNITED STATES PATENT AND TRADEMARK OFFICE
CERTIFICATE OF CORRECTION

PATENT NO. : 4,004,628
DATED : January 25, 1977
INVENTOR(S) : GIORGIO TANGORRA and GIOVANNI CALORI It is certified that error appears in the above-identified patent and that said Letters Patent are hereby corrected as shown below:

Column 1, line 62 change "ecomical" to ---economical---;

Column 3, line 67 after "and" insert ---3/4---;

Column 5, line 35 change "seals" to ---seats---;

Column 5, line 36 change "ae" to ---are---;

Column 6, line 56 change "te" to ---the---.

Claim 18, line 55 change "bring" to ---having---.

Signed and Sealed this

Tenth Day of May 1977

[SEAL]

Attest:

RUTH C. MASON
*Attesting Officer*

C. MARSHALL DANN
*Commissioner of Patents and Trademarks*